US011640697B2

(12) United States Patent
Eathakota et al.

(10) Patent No.: US 11,640,697 B2
(45) Date of Patent: May 2, 2023

(54) REAL ESTATE AUGMENTED REALITY SYSTEM

(71) Applicant: Carrier Corporation, Palm Beach Gardens, FL (US)

(72) Inventors: Hrishi Eathakota, Hyderabad (IN); Adam Kuenzi, Silverton, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/254,583

(22) PCT Filed: Nov. 5, 2019

(86) PCT No.: PCT/US2019/059791
§ 371 (c)(1),
(2) Date: Dec. 21, 2020

(87) PCT Pub. No.: WO2020/097025
PCT Pub. Date: May 14, 2020

(65) Prior Publication Data
US 2021/0279968 A1  Sep. 9, 2021

Related U.S. Application Data

(60) Provisional application No. 62/756,231, filed on Nov. 6, 2018.

(51) Int. Cl.
*G06T 19/00* (2011.01)
*G06T 19/20* (2011.01)
*H04L 67/131* (2022.01)

(52) U.S. Cl.
CPC ............ *G06T 19/006* (2013.01); *G06T 19/20* (2013.01); *H04L 67/131* (2022.05);
(Continued)

(58) Field of Classification Search
None
See application file for complete search history.

(56) References Cited

U.S. PATENT DOCUMENTS 6,973,432 B1   12/2005   Woodard et al.
7,392,208 B2   6/2008   Morse et al.
(Continued)

FOREIGN PATENT DOCUMENTS

| EP | 2206090 B1 | 1/2016 |
| GB | 2494697 A | 3/2013 |
| WO | 2015127534 A1 | 9/2015 |

OTHER PUBLICATIONS

Bogdan-Alexandru Deaky, Luminita Parv, 2017, Virtual Reality for Real Estate, Experiment© International Conference, 2017, University of Algarve, Faro, Portugal, Jun. 6-8.*
(Continued)

*Primary Examiner* — Ryan M Gray
(74) *Attorney, Agent, or Firm* — Bachman & LaPointe, P.C.

(57) ABSTRACT

A method for providing an augmented reality view including inserting a virtual object into a three-dimensional space of a subject real estate property at a location with an input device; and displaying the virtual object in response to the location within the three-dimensional space of the subject real estate property being viewed by a user on a display device.

20 Claims, 7 Drawing Sheets

(52) U.S. Cl.
CPC .. *G06T 2210/04* (2013.01); *G06T 2219/2004* (2013.01); *G06T 2219/2016* (2013.01)

(56) References Cited

U.S. PATENT DOCUMENTS

| | | | |
|---|---|---|---|
| 8,635,104 | B2 | 1/2014 | Adams |
| 9,165,405 | B2* | 10/2015 | Meier ................ G06T 15/20 |
| 9,589,354 | B2* | 3/2017 | Wells ................ G06F 3/03547 |
| 9,836,885 | B1 | 12/2017 | Eraker et al. |
| 9,978,109 | B1* | 5/2018 | Catalano ............. G06Q 50/16 |
| 10,062,205 | B2* | 8/2018 | Eikhoff ............. G06F 16/5854 |
| 11,120,515 | B1* | 9/2021 | Bhatia ............... G06T 19/006 |
| 11,245,837 | B2* | 2/2022 | Manzari ........... H04N 5/23216 |
| 2004/0046798 | A1 | 3/2004 | Alen |
| 2006/0020522 | A1 | 1/2006 | Pratt |
| 2008/0252640 | A1 | 10/2008 | Williams |
| 2013/0179841 | A1* | 7/2013 | Mutton ............... G06T 19/003 715/850 |
| 2013/0271462 | A1 | 10/2013 | Frank |
| 2014/0095122 | A1* | 4/2014 | Appleman ........... G06T 19/003 703/1 |
| 2014/0132595 | A1* | 5/2014 | Boulanger ............ G06T 13/60 345/619 |
| 2015/0332511 | A1* | 11/2015 | Jovanovic ............. G06T 15/20 345/427 |
| 2016/0140676 | A1 | 5/2016 | Fritze et al. |
| 2016/0378887 | A1 | 12/2016 | Maldonado |
| 2017/0140484 | A1 | 5/2017 | Lete et al. |
| 2017/0193616 | A1 | 7/2017 | Marshall et al. |
| 2017/0287218 | A1* | 10/2017 | Nuernberger ....... G06F 3/04845 |
| 2018/0068474 | A1* | 3/2018 | Mowatt ............... G06F 3/012 |
| 2018/0159838 | A1 | 6/2018 | Dintenfass |
| 2019/0197599 | A1* | 6/2019 | Zia ................... G06Q 30/0641 |
| 2019/0251753 | A1* | 8/2019 | Canada .............. G06T 11/60 |
| 2019/0362545 | A1* | 11/2019 | Pejic ................. G06F 30/12 |
| 2021/0407230 | A1* | 12/2021 | Amuduri ............ H04W 12/63 |
| 2022/0383600 | A1* | 12/2022 | Jovanovic ........... G06T 19/20 |

OTHER PUBLICATIONS

Sanni Siltanen and Virpi Oksman, 2013, User-Centered Design of Augmented Reality Interior Design Service, International Journal of Arts & Sciencesi, 6(1), pp. 547-563, ISSN: 1944-6934.*

Mudliyar, Prabhakar, et al. "Virtual reality for interior design." International Journal of Research in Advent Technology 2.3 (2014): 260-263.*

Yu, Xiao. "Research and practice on application of virtual reality technology in virtual estate exhibition." Procedia Engineering 15 (2011): 1245-1250.*

Vazquez, Christian, Nicole Tan, and Shrenik Sadalgi. "Home studio: a mixed reality staging tool for interior design." Extended Abstracts of the 2021 CHI Conference on Human Factors in Computing Systems. 2021. (Year: 2021).*

Park, Jinwoo, et al. ""DreamHouse" NUI-based Photo-realistic AR Authoring System for Interior Design." Proceedings of the 7th Augmented Human International Conference 2016. 2016. (Year: 2016).*

Yue, Ya-Ting, et al. "SceneCtrl: Mixed reality enhancement via efficient scene editing." Proceedings of the 30th annual ACM symposium on user interface software and technology. 2017. (Year: 2017).*

International Search Report dated Jan. 15, 2020 for corresponding International Patent Application No. PCT/US2019/059791.

https://datafloq.com/read/how-augmented-reality-can-improve-real-estate/3745 >.

* cited by examiner

REAL ESTATE AUGMENTED REALITY SYSTEM

BACKGROUND

The present disclosure relates generally to a system to facilitate communication for real estate transactions, and more particularly, to a system to provide augmented reality views during a home showing.

In the real estate industry, a prospective property buyer must often mentally imagine potential improvements and furnishings. This can be frustrating to agents and sellers who are otherwise only minimally able to place the subject property in the best light to the prospective property buyer.

SUMMARY

A method for providing an augmented reality view according to one disclosed non-limiting embodiment of the present disclosure includes modifying a three-dimensional space representative of a subject real estate property to position a virtual object at a desired location within the three-dimensional space; and rendering the virtual object on a display device in response to the location being viewed by a user with the display device.

A further aspect of the present disclosure includes a three-dimensional representation of a piece of furniture.

A further aspect of the present disclosure includes that the piece of furniture is selected from one of a multiple of interior designs stored on a server accessible by the input device and the display device.

A further aspect of the present disclosure includes that an input device is utilized to position the virtual object at the location.

A further aspect of the present disclosure includes superimposing the virtual object onto visual environmental data generated by a camera of the display device.

A further aspect of the present disclosure includes orienting the virtual object with respect to a position of the display device.

A method for providing an augmented reality view according to one disclosed non-limiting embodiment of the present disclosure includes determining a location of a mobile device within a subject real estate property; determining a field of view of the mobile device contains a geo-marked location; retrieving virtual object data from a server for the geo-marked location; and superimposing the virtual object data at the geo-marked location onto a three-dimensional space of the subject real estate property to provide an augmented reality view of the field of view of the mobile device.

A further aspect of the present disclosure includes orienting the virtual object with respect to the mobile device.

A further aspect of the present disclosure includes orienting the virtual object with respect to the display device within the subject real estate property.

A further aspect of the present disclosure includes selecting a virtual object identified by an input device.

A further aspect of the present disclosure includes selecting a virtual object from a database of virtual objects, the database stored on the server.

A further aspect of the present disclosure includes adding or removing a wall.

A further aspect of the present disclosure includes adding a window and providing an outside view.

An augmented reality system according to one disclosed non-limiting embodiment of the present disclosure includes a server to store a location of a virtual object with respect to a three-dimensional space of a subject real estate property; and a mobile device for operation of an augmented reality application, the mobile device in communication with the server to display the virtual object in response to a field of view from the mobile device that contains the location.

A further aspect of the present disclosure includes that the virtual object is selected from a catalogue of virtual objects in a database on the server.

A further aspect of the present disclosure includes a three-dimensional representation of a piece of furniture.

A further aspect of the present disclosure includes that the piece of furniture is selected from one of a multiple of interior designs stored on the server.

A further aspect of the present disclosure includes that the virtual object is manually sized on the augmented reality application.

A further aspect of the present disclosure includes that the virtual object is a wall.

A further aspect of the present disclosure includes communicating the location of the virtual object with respect to the three-dimensional space of the subject real estate property to a third party.

The foregoing features and elements may be combined in various combinations without exclusivity, unless expressly indicated otherwise. These features and elements as well as the operation thereof will become more apparent in light of the following description and the accompanying drawings. It should be understood; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
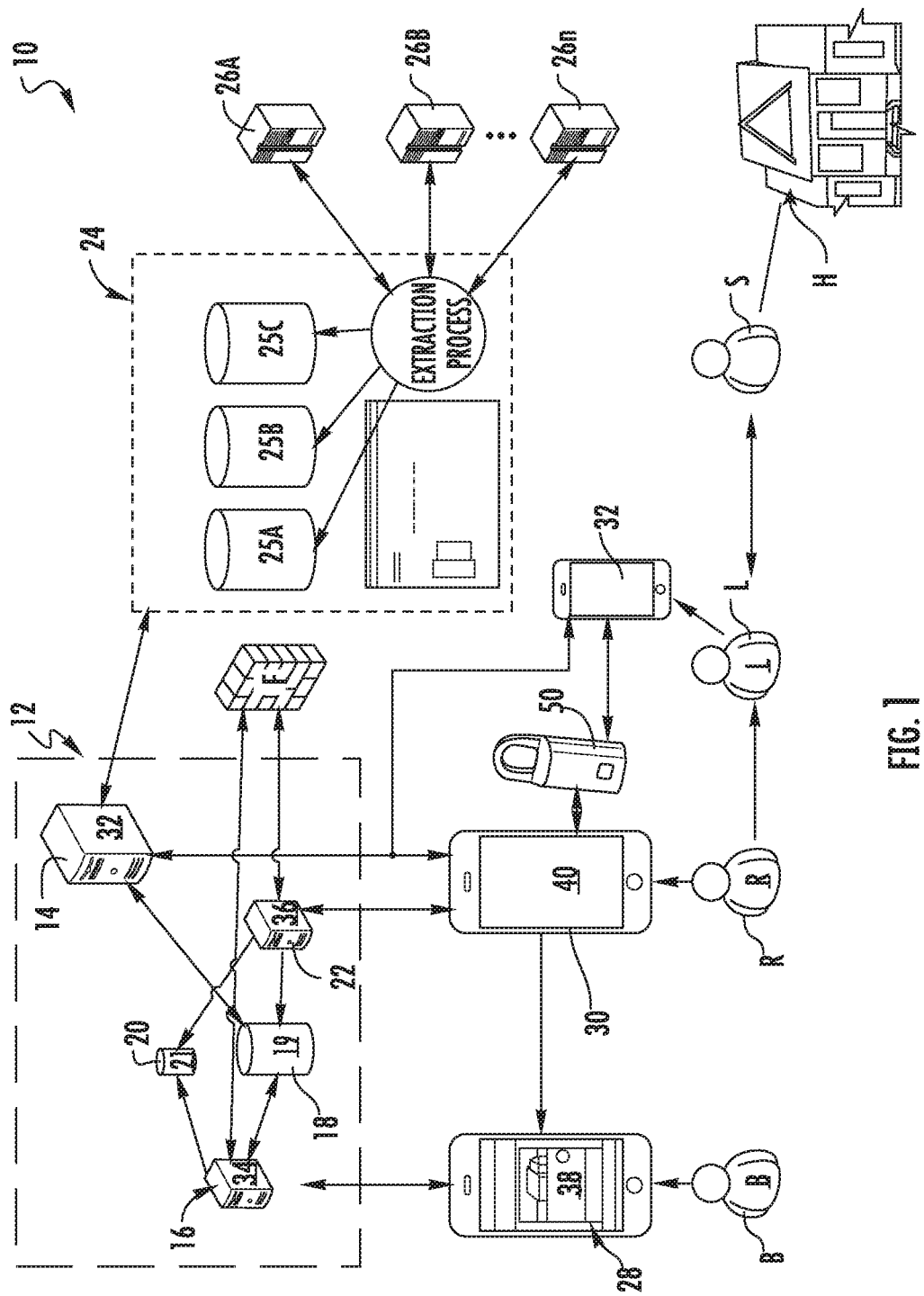
FIG. 1 is a general schematic system diagram of a real estate feedback application system.

FIG. 1 schematically illustrates a system 10 to facilitate communication for real estate transactions. A property buyer "B" is typically represented by a showing agent "R" while a property seller "S" of a subject property "H" is typically represented by a listing agent "L." The listing agent "L" typically communicates with the buyer "B" only indirectly, such as by communication with the showing agent "R" who then communicates with the buyer "B." Although only particular agents are referred to in the illustrated embodiments to provide perspective, the functions of each may be otherwise assigned or rearranged. For example, the listing agent "L" may be a senior person in an agency who utilizes a seller's assistant. The showing agent "R" may similarly utilize a showing assistant. As is discussed below, the prospective buyer "B" may wish to obtain input from third parties "T" such as family, friends, and/or others.

The system 10 to facilitate communication for real estate transactions can include a subsystem 12 that includes a listing recommendation server 14, a buyer server 16, a buyer storage system 18, a log storage system 20, and an electronic key server 22. The listing recommendation server 14 communicates with the buyer storage system 18, the log storage system 20, and a storage system 24. The buyer storage system 18 includes a database 19 that stores, for example, feedback created by the buyer "B" (e.g., buyer feedback, third party feedback, etc.). The log storage system 20 includes a database 21 that collects activity data associated with the property showings.

The storage system 24 may include, but not be limited to, a database for managing key holders 25A, a security database 25B that hosts security protocols, and a listing database 25C that stores extracted property data from external databases 26A, 26B, 26n. The storage system 24 communicates with the external databases 26A-26n such as the Real Estate Transaction Standard (RETS) framework that stores Multiple Listing Service (MLS) data. Communication between the various servers may include internet protocols or the like. The MLS data may include information such as number of bedrooms, number of bathrooms, price of listing, etc. RETS is a framework that can be adopted by computer systems to receive data from the MLS servers, as well as those of other real estate systems provided they also have software installed designed to communicate using the RETS framework. The national association of realtors refers to RETS as a "common language."

A multiple of mobile devices 28, 30, 32 (also shown in FIG. 2), may communicate with the subsystem 12. For example, the mobile devices 28, 30, 32, may be a smartphone, tablet, or other mobile device of the respective user. The mobile device 28 is used by the potential buyer "B," the mobile device 30 is used by the showing agent "R," and the mobile device 32 is used by the listing agent "L." Various other mobile devices may also be in communication with the subsystem 12 either directly or through communication with the mobile devices 28, 30, 32, as an intermediary.

Information is accessible by the listing agent "L" through the subsystem 12 so that the listing agent "L" can, for example, generate reports for their seller "S," send updates about a particular listing to showing agents "R," or provide feedback from a buyer "B" to their seller "S." The subsystem 12 may also obtain information from the RETS framework that stores MLS data. The subsystem 12 may also obtain information generated by an electronic key box 50 that occurs as a consequence of the showing, such as number of times shown, time spent at the subject property for each showing, return showings, etc. The subsystem 12 may also be used by the listing agents "L" to receive automatic notification (e.g., email notices) when a showing occurs at their listings. The subsystem 12 may also be used by the buyer "B" as a repository for information (e.g., details of each property the buyer has viewed, feedback on the properties, etc.). The seller "S" can also receive feedback from the buyer "B" either directly from the subsystem 12, or through communications with the listing agent "L" who communicates with the subsystem 12.

The listing recommendation server 14 hosts, for example, at least an analytics software application that compiles and runs analytics against buyer ratings and MLS listing data from the storage system 24. The buyer server 16 hosts a buyer application program interface (API) 34, and the electronic key server 22 hosts an electronic key API 36. An application program interface (API) may include a set of routines, protocols, and/or tools for building software applications. The API specifies how software components should interact. APIs are used when programming graphical user interface (GUI) components. A server-side web API is a programmatic interface with one or more publicly exposed endpoints to a defined request-response message system.

The listing recommendation server 14 may communicate with a real estate application 38 on the mobile device 28 through the buyer API 34. An agent application 40 on the mobile device 30 may communicate with the listing recommendation server 14 and the electronic key server 22. The buyer API 34 and the electronic key API 36 may also communicate with other external systems through a firewall "F."

The real estate application 38 communicates with the buyer storage system 18 through the buyer API 34 which then stores the feedback, ratings, and notes taken by the property buyer in the database 19 of the buyer storage system 18. The real estate application 38 may be a mobile application on the mobile device 28 that may be used by the buyer "B" to rate the properties they have seen.

The agent application 40 may be a mobile application on the mobile device 30 that may be used by the showing agent "R" to access the electronic key boxes 50 via a short distance communication standard (e.g., Bluetooth, zigbee, wifi etc.). Alternatively, or in addition, the electronic key boxes 50 may be connected (e.g., cellular, IoT protocol, etc.) directly to the listing recommendation server 14. The electronic key API 36 of the electronic key server 22 communicates with the agent application 40 to sync activity information from the electronic key boxes 50 to the electronic key API 36 (e.g., accessed key boxes, update the count of proprietary keys generated for that particular property, create a timestamp indicating that lockbox is opened), and showing notifications (e.g., to an associated showing agent "R").

Figure 2:
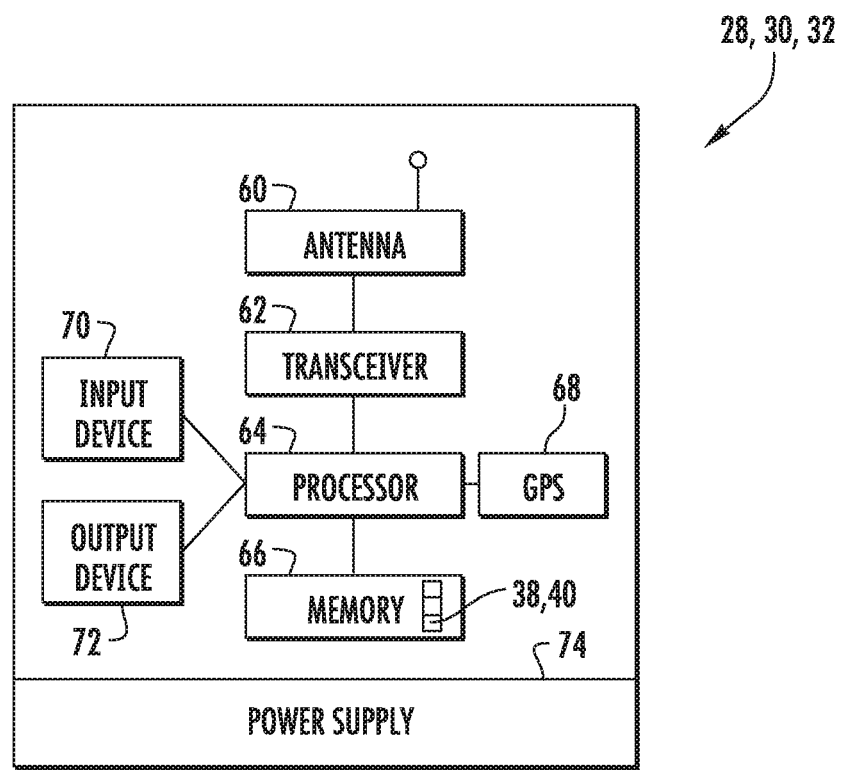
FIG. 2 is a schematic diagram of a mobile device.

With reference to FIG. 2, each mobile device 28, 30, 32, generally includes a mobile device antenna 60, a mobile device transceiver 62, a mobile device processor 64, a mobile device memory 66, a GPS module 68, an input device 70, a display 72, and a mobile device power supply 74. The mobile device processor 64 may be any type of microprocessor having desired performance characteristics. The mobile device memory 66 may include any type of computer readable medium that stores the data and executable instructions described herein below. The executable instructions may be stored or organized in any manner and at any level of abstraction, such as in connection with one or more applications, processes, routines, procedures, methods, etc. The mobile device transceiver 62 is a transceiver of a type corresponding to the mobile device antenna 60 to provide communication for WLAN, cellular, wi-fi, Bluetooth, or other such communications.

Figure 3:
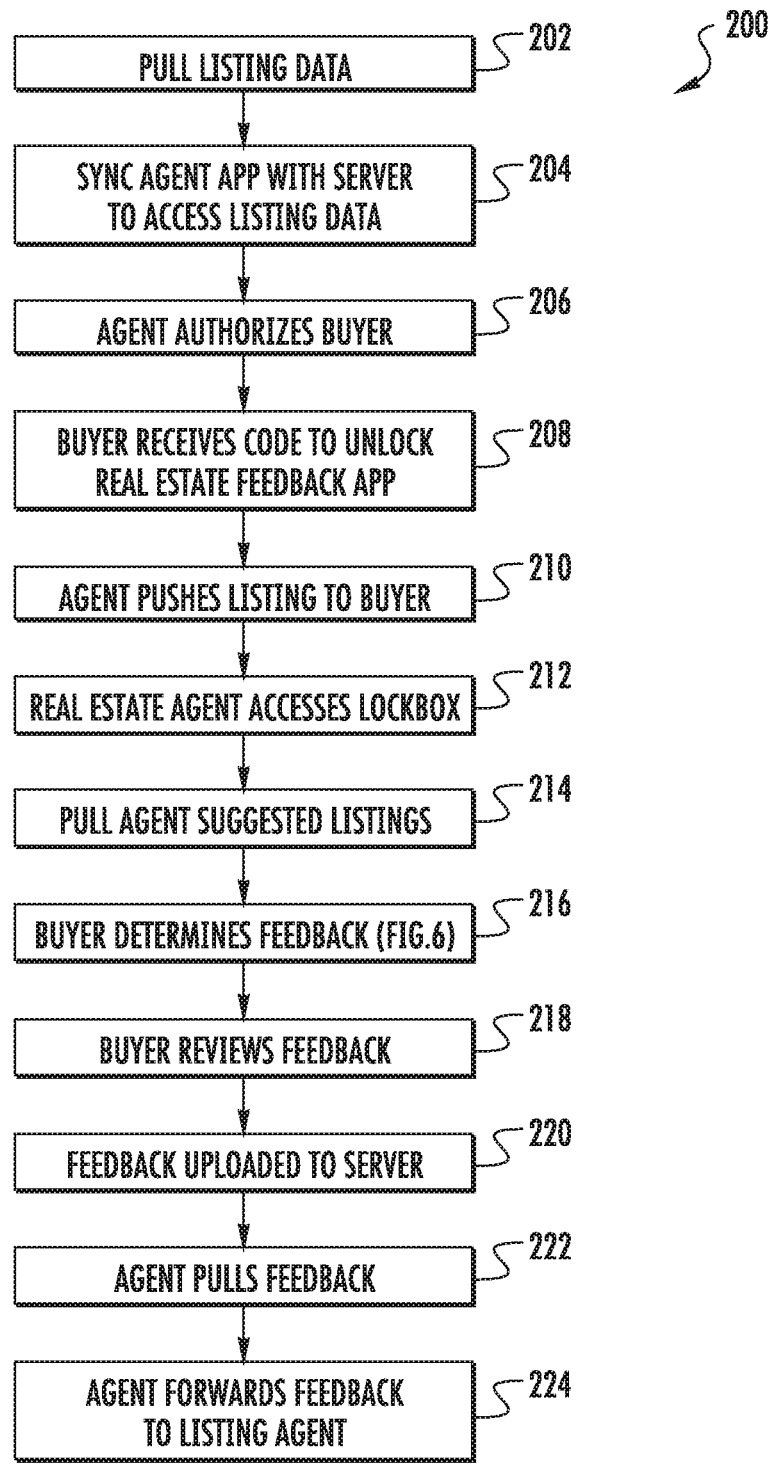
FIG. 3 is a flowchart of a method to provide feedback for real estate, with the system of FIG. 1.

With reference to FIG. 3, a method 200 for operation of the system 10 is disclosed in terms of functional block diagrams. The functions are programmed software routines capable of execution in various microprocessor-based electronics control embodiments and represented herein as block diagrams.

Initially, the owner of the subsystem 12 may have agreements with MLS to selectively extract (202) data such as MLS data from the external data servers 26A-26n (FIG. 1) through the listing recommendation server 14. Next, the agent application 40 syncs (204) with the listing recommendation server 14 and pulls MLS data for desired property listings of interest to the buyer "B" as, for example, selected by the showing agent "R." This may be performed through an automated sync through the agent application 40. The showing agent "R" may also perform a manual sync to obtain the MLS data.

Through the agent application 40, the showing agent "R" can then authorize (206) the prospective property buyer "B" to access the desired property listings of interest to the buyer "B." Through the agent application 40, the showing agent "R" may, for example, authorizes the buyer "B" through input of buyer identification information (e.g., buyer name and email address.) The buyer identification information is then communicated to the listing recommendation server 14 so that the listing recommendation server 14 communicates to the buyer "B" (e.g., via email to provide a link to an app store) with a code to unlock (208) the real estate application 38. The buyer "B" is then authorized to download the real estate application 38 and the desired property listings of interest to the buyer "B," to maintain the value of the showing agent "R" in the real estate transaction. Alternatively, the buyer "B" already has the real estate application 38 and the desired property listings of interest to the buyer "B" are readily received.

Through the agent application 40, the showing agent "R" can continue to push (210) property listings to the real estate application 38. Access may be provided for one or more properties by a showing code, or other information that unlocks one or more modules in the real estate application 38. The modules may include features or other aspects that are particular tailored to certain parties in the real estate transaction. The showing agent "R" is able to selectively push the desired property listings of interest to the buyer "B" through the subsystem 12 to be viewable within the real estate application 38. The showing agent "R" also uses the agent application 40 to operate the electronic key box 50 to access the property for showing to the buyer "B."

Next, during the showing, feedback may be entered into the real estate feedback application 38 by the buyer "B" for the property. The feedback may include any data associated with the properties that may, for example, facilitate reviewing and comparing properties. The real estate feedback application 38 may be a module of the real estate application 38, and/or other application. As the buyer generates feedback about the property, the real estate feedback application may also upload the feedback to the buyer storage system 18 via the buyer API 34. Once the showing is complete, the buyer "B" can choose to selectively share the feedback with their showing agent "R" via the real estate feedback application which, in response, authorizes the listing recommendation server 14 to release the feedback from the buyer storage system 18. The agent application 40 then syncs with the listing recommendation server 14 and downloads the feedback (222). The showing agent "R" is then able to review the feedback on the agent application 40. Through the agent application 40, the showing agent "R" can communicate the feedback to the listing agent "L" (224).

Figure 4:
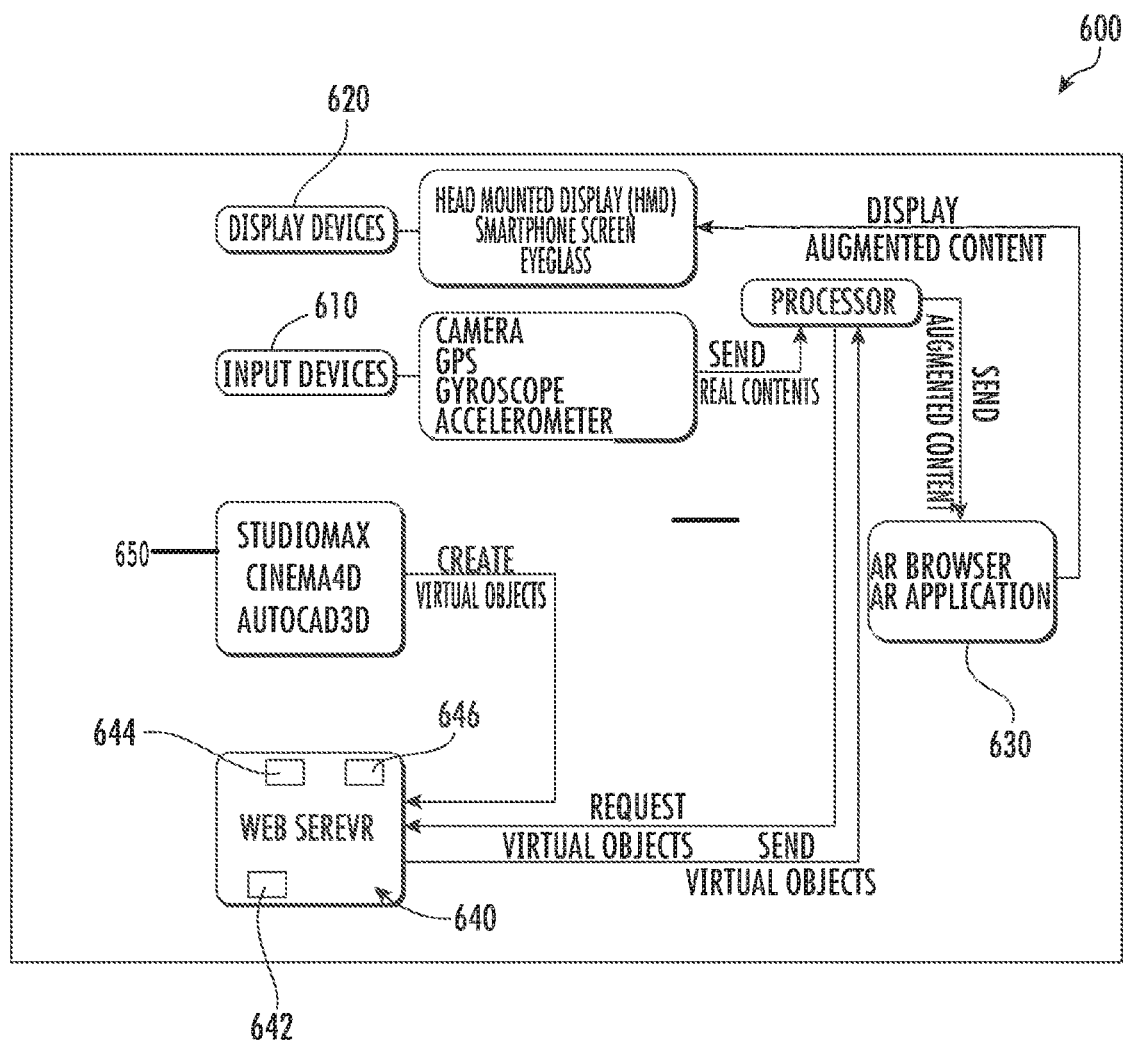
FIG. 4 is a schematic view of an augmented reality system.

With reference to FIG. 4, an augmented reality system 600 may be integrated with the system 10 for use by the showing agent "R," the listing agent "L" and the prospective property buyer "B." The augmented reality system 600 generally includes an input device 610, a display device 620, an augmented reality application 630, and a server 640. The augmented reality application 630 may be a sub-application within the real estate application 38 (FIG. 1), the agent application 40, an application associated therewith, or a stand-alone application that is in communication with the system 10.

The input device 610 may be, for example, the agent mobile device 28. The input device 610 utilizes the augmented reality application 630. The display device 620 may be, for example, the buyer mobile device 28, a monitor, display eyeglass, Head Mounted Displays (HMD), or other device that utilizes the augmented reality application 630. The input device 610 and the display device 620 may include a camera, a gyroscope, an accelerometer, and/or other sensor to facilitate operation of a method 700 (FIG. 5) for providing an augmented reality view of the subject real estate property "H" (FIG. 1) via the augmented reality application 630.

The server 640 may be a portion of the listing recommendation server 14, a stand-alone server in the system 10 (FIG. 1), a physical or cloud-based server that can run on the same machine or on different machines on the same network of the system architecture.

The server 640 contains, in this embodiment, a database 642 of three-dimensional environment data representative of the respective subject real estate properties, and a database 644 of virtual images such as furniture, appliances, fixtures, lighting schemes, cabinets, walls, doors, trim, porches, driveways, brickwork, planter boxes, play structure, etc., etc. for selection by, for example, the showing agent "R," to be presented to a particular prospective property buyer "B." That is, the showing agent "R" can configure a particular property for a particular prospective property buyer "B" to present the property in the best light for each prospective property buyer "B." Based on the request received from the particular prospective property buyer "B" the augmented reality application 630, the selected virtual images are retrieved from the server 640 and communicated to the augmented reality application 630. The server 640, in this embodiment, also contains a database 646 of locations in the three-dimensional environment data representative of the location of particular virtual images, e.g., geo-markers, as selected and placed through the input device 610.

Figure 5:
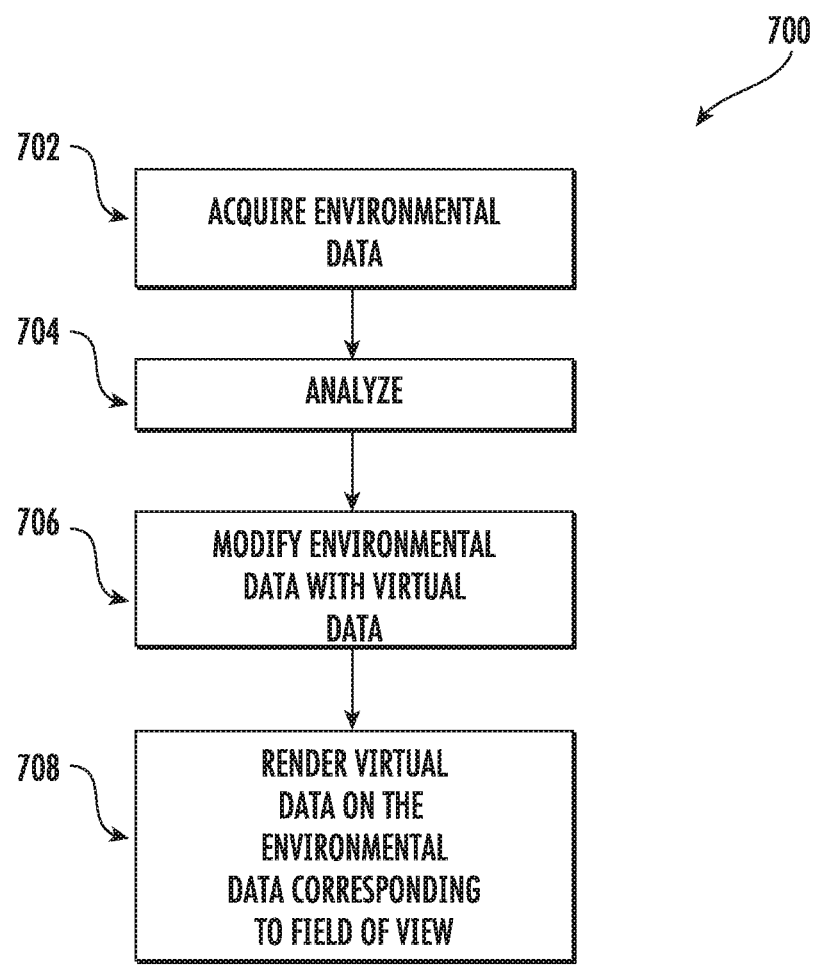
FIG. 5 is a flowchart illustrating operation of the augmented reality system.

With reference to FIG. 5, the method 700 for providing an augmented reality view for a subject real estate property is disclosed in terms of functional block diagrams. The functions are programmed software routines and executable instructions capable of execution in various microprocessor-based electronics control embodiments and represented herein as block diagrams.

Figure 6:
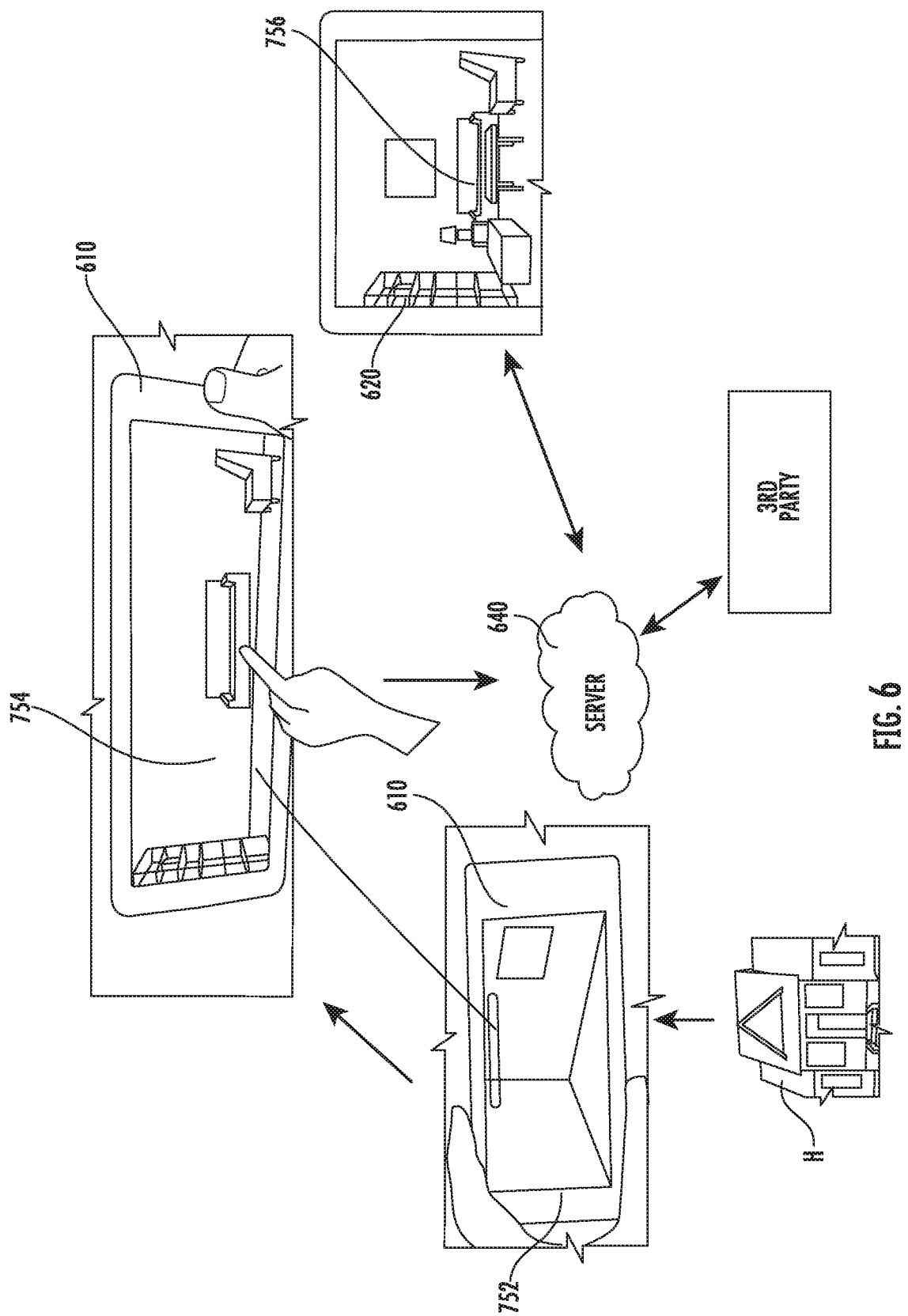
FIG. 6 is a schematic view illustrating operation of the augmented reality system.

Initially, visual environment data of the subject real estate property "H" (FIG. 1) is acquired (702) with the input device 610 (FIG. 6). The visual environment data may be obtained by the showing agent "R," the buyer "B," or some other user. Sensors of the input device 610 such as one or more cameras, GPS modules, and/or other sensors, which are typically standard on board a mobile device such as a smart phone, may be utilized by the augmented reality application 630 to collect the visual environment data (752; FIG. 6) regarding the subject property.

The input device 610 typically includes a rear-facing camera that will capture live visual environment data of the subject real estate property "H" which can be processed for depth information per pixel captured, so that images gain an extra dimension of depth data. The augmented reality application 630 will make triangulation calculations in real time to determine the distance to corresponding points in the images.

Next, the visual environment data is analyzed (704) by the augmented reality application 630 to determine the three-dimensional space of the subject real estate property "H". The augmented reality application 630 may utilize one or more various augmented reality processes such as simultaneous localization and mapping (SLAM), geo-marking, or others. Examples of such are augmented reality kits, namely the Apple AR kit, or Google Tango. These augmented reality kits perform environment mapping to determine the three-dimensional space of the subject real estate property "H" (FIG. 1) as the device is moved and allow the augmented reality application 630 to capture visual data from one or more of the on-board sensors.

The showing agent "R" or the buyer "B" will then select images from the server 640 and orient via the display device 620. The user can then manually zoom the image to scale it via the augmented reality application 630 with the background for proper alignment on the display device 620.

Next, the captured visual environment data can be modified (706) by including virtual objects (754; FIG. 6) into the three-dimensional space of the subject real estate property at a desired location or locations. The visual environment data may be modified with the inclusion of virtual object data that overlaps the three-dimensional space at desired locations via the augmented reality application 630. The virtual images may be created by, for example, 3D software 650 (FIG. 4) such as AutoCad3D, StudioMax, Cinema4D, etc., that is then stored in the database 644 of virtual images for access by the augmented reality application 630. Alternatively, other three-dimensional virtual images can be generated and stored in the database 644 of virtual images for later use.

In embodiments, a 3rd party company could 'stage' the subject real estate property "H" by positioning virtual objects (cabinets, etc.) based upon a proposal—there could be multiple proposals and a user can then 'view' each proposal by switching between them.

The augmented reality application 630 is then utilized to select and position the virtual object into the three-dimensional space of the subject real estate property at a desired location, for example, a particular table is selected from the database 644 of virtual images then placed in a particular location in the subject real estate property. The desired location may be identified by a geo-marker that positions the virtual object in the three-dimensional space of the subject real estate property. In addition, the virtual object could be the addition of a wall or removal of a wall. In the case of the addition of a wall, the virtual object wall would obscure normally viewable parts of the scene. In the case of removal, parts of the scene from other rooms can then be seen. This could also be used to add/remove a window. Based on integration with, for example, a map application such as Google earth, by knowing the height of the window and geo coordinate position, the prospective property buyer "B can be provided with a virtual view from the virtual window. Further, the virtual objects can include those outside as well as inside the subject real estate property "H" (i.e. a swing set in the backyard, porch, patio, patio furniture, car in the garage, etc.).

Then, in response to a field of view corresponding to the location of the virtual object in the three-dimensional space of the subject real estate property, the virtual object data (756; FIG. 6) from the server 640 is rendered (708) on the display device 620 by the augmented reality application 630. In other words, when the user's GPS matches that of the virtual object, the virtual object is rendered onto the user's screen. For example, the display device 620 may be that of the prospective property buyer "B" as the prospective property buyer "B" tours the subject property.

Based on the request received from the augmented reality application 630, which may be application 38 as discussed above, the virtual images are retrieved from the server 640 and sent to the augmented reality application 630 for display on the display device 620. The location of the display device 620 may be determined by, for example, the internal GPS and/or other positional sensor of the display device 620. That is, the virtual object is displayed when the location of the virtual object within the three-dimensional space of the subject real estate property is viewed by the user of the display device 620 such as the prospective property buyer "B."

In embodiments, as the prospective property buyer "B" tours the subject real estate property "H", the prospective property buyer "B" can add/remove virtual objects from their current view on the display device 620 and position the virtual objects themselves through the augmented reality application 630.

Figure 7:
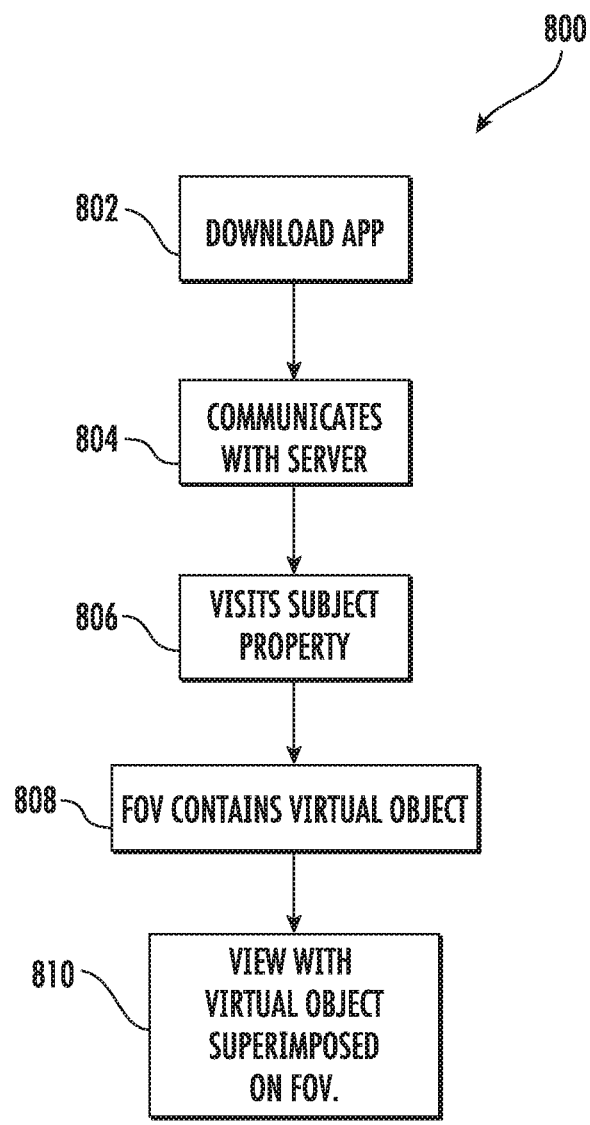
FIG. 7 is a flowchart illustrating operation of the augmented reality system from the perspective of a user.

With reference to FIG. 7, a method 800 for providing an augmented reality view for a real estate property via the augmented reality application 630 from the perspective of the buyer "B" is disclosed in terms of functional block diagrams. The functions are programmed software routines and instructions capable of execution in various microprocessor-based electronics control embodiments and represented herein as block diagrams.

Initially, the buyer "B" downloads (802) the augmented reality application 630 from a source such as an app store. The augmented reality application 630 communicates (804) with the listing recommendation server 14 via the buyer API 34 to pull the augmented reality data for the subject property. The showing agent "R" then typically escorts the buyer "B" for a showing of subject property (806). Next, during the showing, the particular prospective property buyer "B" directs the display device 620 around within the subject property. When a geo-marked location is viewed within the field of view (808), based on, for example the display device GPS, the augmented reality application 630 will retrieve the virtual object data from the server 640 and superimpose the virtual object data (e.g., a table) at that previously marked location (810). The prospective property buyer "B" will then view the virtual object data (e.g., the table) superimposed on the view of the subject property via the augmented reality application 630. The prospective property buyer "B" can also save an augmented reality view in a snapshot (photo/picture) that is a permanently rendered view of a scene inside/outside that includes virtual objects that can be viewed later on the display device 620. A floorplan of the subject real estate property "H" can also be generated that shows the location of all the virtual objects to be provided to a $3^{rd}$ party such as a moving company The augmented reality application 630 can improve an agent's chance of selling the subject property as the subject property can be tailored to particular buyers "B." That is, the subject property can be modified as per the taste of the particular buyer "B" and home improvement partners. Further, third parties such as movers can setup the subject property exactly as desired by the buyer "B." Data collected from these sales can be used for analytics such as buyer preferences, third party capabilities, sales improvement post modifications etc.

The elements described and depicted herein, including in flow charts and block diagrams throughout the figures imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed:

1. A method for providing an augmented reality view, comprising:
   modifying a three-dimensional space representative of a subject real estate property to position a virtual object at a desired location within the three-dimensional space; and
   rendering the virtual object on a display device in response to the desired location being viewed by a user of the display device, wherein the virtual object is selected by the user from a set of virtual objects from a database of virtual objects; wherein the set of virtual objects from the database is staged by a third party and is presented to the user when the display device is detected at the desired location.

2. The method as recited in claim 1, wherein the virtual object comprises a three-dimensional representation of a piece of furniture.

3. The method as recited in claim 2, wherein the piece of furniture is selected by the user from one of a multiple of interior designs stored on a server accessible by the input device and the display device.

4. The method as recited in claim 1, wherein an input device is utilized to position the virtual object at the location.

5. The method as recited in claim 1, further comprising:
   wherein the rendering step comprises superimposing the virtual object onto visual environmental data generated by a camera of the display device.

6. The method as recited in claim 5, wherein the rendering step comprises orienting the virtual object with respect to a position of the display device.

7. A method for providing an augmented reality view, comprising:
   determining a location of a mobile device of a buyer within a subject real estate property;
   determining when a field of view of the mobile device contains a geo-marked location within the subject real estate property;
   retrieving a set of virtual object data from a server with access to a database of virtual objects for the geo-marked location when the field of view of the mobile device contains the geo-marked location, and allowing the buyer to select a virtual object to be displayed from the set of virtual object data; and
   superimposing the virtual object at the geo-marked location onto a three-dimensional space of the subject real estate property to provide an augmented reality view of the field of view of the mobile device.

8. The method as recited in claim 7, wherein the superimposing step comprises orienting the virtual object with respect to the mobile device.

9. The method as recited in claim 7, wherein the superimposing step comprises orienting the virtual object with respect to the display device within the subject real estate property.

10. The method as recited in claim 7, wherein the selecting step comprises selecting a virtual object identified by an input device.

11. The method as recited in claim 7, wherein the retrieving step comprises selecting the virtual object from the database of virtual objects, the database stored on the server.

12. The method as recited in claim 7, wherein the superimposing step comprises adding or removing a wall.

13. The method as recited in claim 7, wherein the superimposing step comprises adding a window and providing an outside view.

14. A real estate augmented reality system, comprising:
   a server storing images of virtual objects corresponding to at least one location with respect to a three-dimensional space of a subject real estate property; and
   a mobile device for operation of an augmented reality application, the mobile device in communication with the server, and the augmented reality application being configured to display a catalogue of virtual objects to a user of the mobile device, the mobile device being configured to receive a selection from the user of a specific virtual object from the catalogue, the set of images of virtual objects being displayed to the user in response to a field of view from the mobile device that contains the location, wherein the augmented reality application is configured to superimpose the specific virtual object selected by the user of the mobile device onto the three-dimensional space of the subject real estate property.

15. The system as recited in claim 14, wherein the virtual object comprises a three-dimensional representation of a piece of furniture.

16. The system as recited in claim 14, wherein the piece of furniture is selected from one of a multiple of interior designs stored on the server.

17. The system as recited in claim 14, wherein the virtual object is manually sized on the augmented reality application.

18. The system as recited in claim 14, wherein the virtual object is a wall.

19. The system as recited in claim 14, further comprising communicating the location of the virtual object with respect to the three-dimensional space of the subject real estate property to a third party.

20. The method of claim 1, wherein the desired location is a geo-marked location marked within visual environmental data of the subject real estate property.

* * * * *